United States Patent
Saenz et al.

(10) Patent No.: US 6,390,570 B1
(45) Date of Patent: May 21, 2002

(54) VEHICLE SOLENOID VALVE

(75) Inventors: Raymundo Saenz, Miamisburg, OH (US); Alejandro Moreno, El Paso, TX (US); David Fredrick Reuter, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/725,392

(22) Filed: Nov. 29, 2000

(51) Int. Cl.$^7$ ................................................ B60T 8/36
(52) U.S. Cl. .................................................. 303/119.2
(58) Field of Search ............................ 303/9, 13, 21 F, 303/40, 61–63, 68, 69, 119.1, 119.2; 188/170, 181 A; 137/627.5

(56) References Cited

U.S. PATENT DOCUMENTS 3,907,379 A * 9/1975 Lawson ..................... 303/21 F
5,015,046 A * 5/1991 Bissell ....................... 303/118

* cited by examiner

Primary Examiner—Paul N. Dickson
Assistant Examiner—C. T. Bartz
(74) Attorney, Agent, or Firm—Margaret A. Dobrowitsky

(57) ABSTRACT

A vehicle solenoid valve includes an inlet port circumscribed by a rounded cup-shaped valve seat and an outlet port. A two-piece poppet is installed within the valve and includes a non-magnetic poppet shaft connected to a frustum-shaped poppet head. The poppet head includes an integrally formed, rounded nose that is sized and shaped to engage the rounded cup-shaped valve seat. The poppet is movable between an open configuration, wherein the rounded nose is distanced from the valve seat, and a closed configuration, wherein the rounded nose engages the valve seat to block fluid communication through the valve.

14 Claims, 1 Drawing Sheet

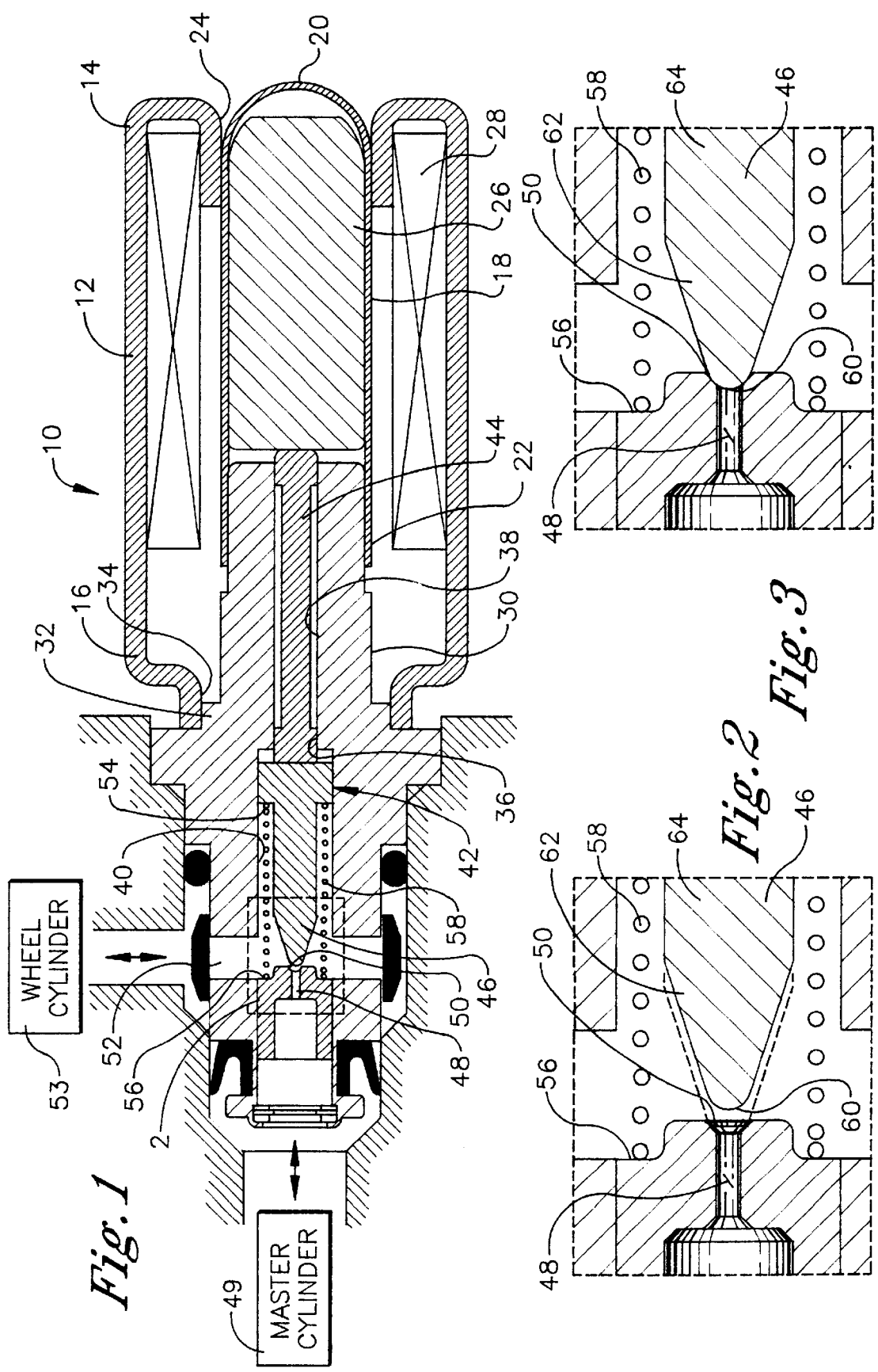

VEHICLE SOLENOID VALVE

TECHNICAL FIELD

The present invention relates to devices used to control the flow of fluid through vehicle fluid systems, such as a vehicle anti-lock brake system.

BACKGROUND OF THE INVENTION

For safety concerns, many of today's vehicles are equipped with anti-lock brake systems (ABS). An ABS maintains vehicle control during extreme braking by electronically sensing when the wheels are just about to lock up and releasing the brakes before lock up occurs. An ABS is capable of modulating the pressure in the wheel cylinders in order to keep the wheels from slipping on the roadway during harsh braking conditions.

In general, a typical anti-lock brake system can include several solenoid valves to control the hydraulic fluid pressure in the individual components, e.g., a master cylinder, and a plurality of wheel cylinders. Usually a normally open solenoid valve is installed between the master cylinder and each wheel cylinder. During normal braking these valves permit uninhibited fluid communication between the master cylinder and the wheel cylinder. However, in the event of panic brake application by a driver, these valves are energized to provide a smooth and stable cycling of fluid pressure to the wheel cylinders in order to prevent brake lock-up. A very common solenoid valve used in the above described application includes a relatively small chromium steel ball that is crimped into the nose of a valve poppet. When the valve is energized, the steel ball engages a chamfered valve seat in order to block fluid communication through the valve. Unfortunately, it happens that the crimp holding the steel ball within the nose of the poppet can fail and cause the steel ball to fall out of the nose of the poppet and damage the valve, the master cylinder, or the wheel cylinder. Moreover, if it is necessary to decrease the size of the ball so that it will fit into a relatively small valve seat, the process to crimp the nose of the poppet around the steel ball becomes increasingly difficult. Thus, the minimum size of the ball, the corresponding valve seat and the inlet orifice is limited by the crimping process and flow restrictions through the inlet port. It also happens that the crimped material around the steel ball can restrict flow around the nose of the poppet when the valve is open.

The present invention has recognized the above-mentioned prior art drawbacks, and has provided the below-disclosed solutions to one or more of the prior art deficiencies.

SUMMARY OF THE INVENTION

A vehicle solenoid valve includes an inlet port that is circumscribed by a rounded, cup-shaped valve seat and an outlet port. Within the valve, is a poppet that has a rounded nose which is configured to engage the valve seat. The poppet is movable between an open configuration, wherein the rounded nose is distanced from the valve seat, and a closed configuration, wherein the rounded nose engages the valve seat to block fluid communication through the valve.

In a preferred embodiment, the poppet includes a non-magnetic poppet shaft and a poppet head that is attached to the shaft. Preferably, the poppet head includes a frustum-shaped portion that is contiguous to the nose and a cylindrical portion that is contiguous to the frustum-shaped portion. In a preferred embodiment, the valve communicates with a wheel brake cylinder and a master brake cylinder to selectively control fluid communication therebetween.

In another aspect of the present invention, a solenoid valve poppet includes a non-magnetic poppet shaft and a poppet head that is connected to the poppet shaft. In this aspect of the present invention, the poppet head has a rounded nose.

In yet another aspect of the present invention, a valve for selectively establishing communication between a vehicle master brake cylinder and a vehicle wheel brake cylinder includes an inlet port and an outlet port. The inlet port is connected to one of: the master brake cylinder and the wheel brake cylinder and the outlet port is connected to the other. In this aspect of the present invention, one of the ports forms a valve seat and the valve includes a multi-piece poppet that has a frustum-shaped poppet head that terminates in a nose which is configured for engaging the valve seat.

The present invention will now be described, by way of example, with reference to the accompanying drawings, in which:

BRIEF DESCRIPTION OF THE DRAWINGS

FIG. 1 is a cross-sectional view of the valve in the de-energized configuration schematically showing the wheel cylinder and the master cylinder;

FIG. 2 is a detail view of the valve in the de-energized configuration as indicated by box 2 in FIG. 1; and FIG. 3 is a detail view of the valve in the energized configuration.

DESCRIPTION OF AN EMBODIMENT OF THE INVENTION

Referring initially to FIG. 1, a vehicle solenoid valve is shown and generally designated 10. FIG. 1 shows that the vehicle solenoid valve 10 includes a preferably metal, hollow, generally cylindrical coil housing 12 that defines a proximal end 14 and a distal end 16. Within the coil housing 12 is a preferably metal, generally tubular plunger cup 18 having a closed proximal end 20 and an open distal end 22. As shown in FIG. 1, the proximal end 14 of the coil housing 12 is formed with a hole 24 that is sized to receive the plunger cup 18. In a preferred embodiment, the plunger cup 18 is press fitted into the hole 24 such that the closed proximal end 20 of the plunger cup 18 is supported by the proximal end 14 of the coil housing 12 and the rest of the plunger cup 18 extends into the interior of the coil housing 12.

Continuing the description of the valve 10, a plunger 26 is reciprocably disposed within the plunger cup 18. A hollow toroidal coil 28 closely surrounds the plunger cup 18 and is magnetically coupled to the plunger 26. Extending from the open distal end 22 of the plunger cup 18 is a preferably metal, generally cylindrical poppet housing 30. As shown in FIG. 1, the poppet housing 30 forms an external flange 32 near its middle. The flange 32 is sized to fit within a hole 34 formed in the distal end 16 of the coil housing 12. Preferably, the distal end 16 of the coil housing 12 is press fitted around the flange 32. Thus, the flange 32 is engaged along its outer periphery with the hole 34 formed in the distal end 16 of the coil housing 12 to support the poppet housing 30 and enclose the distal end 16 of the coil housing 12.

Referring still to FIG. 1, the poppet housing 30 is formed with a central bore 36 having a relatively narrow first portion 38 that expands into a larger second portion 40. Reciprocably disposed within the central bore 36 is a two-piece poppet 42 that includes a solid, generally cylindrical shaft 44 and a solid head 46. In a preferred embodiment, the poppet shaft 44 is manufactured from non-magnetic steel and the poppet head 46 is manufactured from case-hardened steel.

As shown in FIG. 1, the poppet housing 30 is also formed with an inlet port 48 that is circumscribed by a valve seat 50. As intended by the presently preferred embodiment, the inlet port 48 provides fluid communication between a master cylinder 49 and the valve 10. Moreover, the poppet housing 30 is formed with an outlet port 52 that provides fluid communication between the valve 10 and a wheel cylinder 53. The poppet 42 selectively engages the valve seat 50 to control fluid communication through the solenoid valve 10.

FIG. 1 shows that the poppet head 46 is formed with a first spring contact face 54. Moreover, the poppet housing 30 is formed with a second spring contact face 56 around the valve seat 50. A spring 58 is installed in compression between the first spring contact face 54 and the second spring contact face 56 to bias the poppet head 46 away from the valve seat 50.

Referring now to FIGS. 2 and 3, the details concerning the poppet head 46 and the valve seat 50 are shown. FIGS. 2 and 3 show that the poppet head 46 is formed with a rounded nose 60. As intended by the present invention, the valve seat 50 has a rounded cup shape that is sized and shaped to sealingly receive the rounded nose 60 of the poppet head 46, when the coil 28 is energized as described below. From the rounded nose 60, a frustum-shaped portion 62 extends radially outward toward the proximal direction and terminates in a solid cylindrical portion 64 of the poppet head 46.

Initially, with the coil 28 deenergized, the valve is in an open configuration, i.e., the rounded nose 60 of the poppet head 46 is slightly distanced from the valve seat 50, as shown in FIG. 2, to permit fluid communication between the master cylinder 49 and the wheel cylinder 53. However, when the coil 28 is energized, the poppet 42 is moved to the left, looking at FIG. 1, against the force of the spring and the fluid pressure at the inlet port 48, such that the valve is in a closed configuration, wherein the fluid communication between the master cylinder 49 and the wheel cylinder 53 is blocked. When the coil 28 is subsequently deenergized, the spring 58 biases the poppet 46 to the right, looking at FIG. 1, such that the valve is again in the open configuration, wherein fluid communication is permitted between the master cylinder 49 and the wheel cylinder 53 through the solenoid valve 10.

Thus, under normal braking conditions, i.e., with the coil 28 de-energized, the solenoid valve 10 permits fluid communication from the master cylinder to the wheel cylinder. However, under harsh braking conditions, e.g., when impending brake lock-up is sensed, the solenoid valve 10 is energized such that the rounded nose 60 of the poppet head 46 engages the correspondingly-shaped valve seat 50 to block fluid communication between the master cylinder and the wheel cylinder. With the configuration of structure described above, it is to be appreciated that the vehicle solenoid valve 10 eliminates the crimped steel ball that can fall out of the nose of the poppet head 46 and cause the primary function of the solenoid valve 10 to degrade. Additionally, the present vehicle solenoid valve 10 eliminates the crimp at the nose of the poppet head 46 that can restrict fluid flow around the nose of the poppet head 46. Moreover, the rounded nose 60 of the poppet head 46 can be machined to a very small size such that it can block a valve seat 50 circumscribing a very small inlet port 48.

While the particular VEHICLE SOLENOID VALVE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A vehicle solenoid valve, comprising:

at least one inlet port circumscribed by a rounded, cup-shaped valve seat;

at least one outlet port; and a poppet having a rounded nose, the poppet being movable between an open configuration, wherein the rounded nose is distanced from the valve seat, and a closed configuration, wherein the rounded nose engages the valve seat to block fluid communication through the valve, the poppet including a non-magnetic poppet shaft and a poppet head attached to the shaft.

2. The valve of claim 1, wherein the poppet head includes a frustum-shaped portion contiguous to the nose.

3. The valve of claim 2, wherein the poppet head includes a cylindrical portion contiguous to the frustum-shaped portion.

4. The valve of claim 1, further comprising:

a wheel brake cylinder communicating with the valve; and a master brake cylinder communicating with the valve.

5. A solenoid valve poppet, comprising:

a non-magnetic poppet shaft; and a poppet head connected to the poppet shaft, the poppet head having a rounded nose.

6. The solenoid valve poppet of claim 5, wherein the poppet is installed in a solenoid valve having at least one inlet port circumscribed by a valve seat and at least one outlet port, the poppet being movable between an open configuration, wherein the rounded nose is distanced from the valve seat, and a closed configuration, wherein the rounded nose engages the valve seat to block fluid communication through the valve.

7. The solenoid valve poppet of claim 5, wherein the poppet head includes a frustum-shaped portion contiguous to the nose.

8. The solenoid valve poppet of claim 7, wherein the poppet head includes a cylindrical portion contiguous to the frustum-shaped portion.

9. The solenoid valve poppet of claim 5, wherein the poppet head is made of a different material than the poppet shaft.

10. The solenoid valve poppet of claim 6, wherein the valve communicates with a wheel brake cylinder and a master brake cylinder.

11. A valve for selectively establishing communication between a vehicle master brake cylinder and a vehicle wheel brake cylinder, comprising:

an inlet port connected to one of: the master brake cylinder and the wheel brake cylinder;

an outlet port connected to the other of the master brake cylinder and the wheel brake cylinder, at least one of the ports forming a valve seat; and a multi-piece poppet having a frustum-shaped poppet head terminating in a nose configured for engaging the valve seat.

12. The valve of claim 11, wherein the poppet head is attached to a non-magnetic poppet shaft.

13. The valve of claim 11 wherein the poppet head includes a frustum-shaped portion contiguous to the nose.

14. The valve of claim 13, wherein the poppet head includes a cylindrical portion contiguous to the frustum-shaped portion.

* * * * *